US012438259B2

(12) United States Patent
Bui-Van et al.

(10) Patent No.: US 12,438,259 B2
(45) Date of Patent: Oct. 7, 2025

(54) ELECTRICAL TERMINAL, SYSTEM AND ASSOCIATED METHODS

(71) Applicant: AGC GLASS EUROPE, Louvain-la-Neuve (BE)

(72) Inventors: Hà Bui-Van, Louvain-la-neuve (BE); Peter Schnörch, Brussels (BE); Remi Sarkis, Louvain-la-Neuve (BE)

(73) Assignee: AGC GLASS EUROPE, Louvain-la-neuve (BE)

( * ) Notice: Subject to any disclaimer, the term of this patent is extended or adjusted under 35 U.S.C. 154(b) by 66 days.

(21) Appl. No.: 18/568,100

(22) PCT Filed: Jun. 8, 2022

(86) PCT No.: PCT/EP2022/065603
§ 371 (c)(1),
(2) Date: Dec. 7, 2023

(87) PCT Pub. No.: WO2022/258717
PCT Pub. Date: Dec. 15, 2022

(65) Prior Publication Data

US 2024/0275031 A1 Aug. 15, 2024

(30) Foreign Application Priority Data

Jun. 10, 2021 (EP) .................................... 21178868

(51) Int. Cl.
*H01Q 1/32* (2006.01)
*H01Q 1/12* (2006.01)
(Continued)

(52) U.S. Cl.
CPC ......... *H01Q 1/3275* (2013.01); *H01Q 1/1271* (2013.01); *H01R 24/50* (2013.01); *H01R 43/205* (2013.01)

(58) Field of Classification Search
None
See application file for complete search history.

(56) References Cited

U.S. PATENT DOCUMENTS 4,598,961 A 7/1986 Cohen
5,120,258 A 6/1992 Carlton
(Continued)

FOREIGN PATENT DOCUMENTS

JP 2012-109187 A 6/2012

OTHER PUBLICATIONS

International Search Report Issued Sep. 9, 2022, in PCT/EP2022/065603, filed on Jun. 8, 2022, 3 pages.

*Primary Examiner* — Wilson Lee
(74) *Attorney, Agent, or Firm* — Oblon, McClelland, Maier &Neustadt, L.L.P.

(57) ABSTRACT

An electrical terminal for electrically connecting a cable to an electrical circuit, especially an antenna, disposed on a thin support comprising a connection part that includes a center-pin, and a surrounding metallic ring and a base part that includes a dielectric substrate having a top surface and a bottom surface, a ring metallic pad electrically connected to the surrounding metallic ring, and a pin metallic pad electrically connected to the center-pin and electrically isolated from the ring metallic pad; the ring metallic pad and the pin metallic pad being disposed on the bottom surface; the connection part being disposed on the top surface of the base part and extending substantially perpendicular to the top surface. The base part further comprises a ring penetration means designed to penetrate through the thin support. The dielectric substrate and the ring penetration means are not coplanar.

13 Claims, 3 Drawing Sheets

(51) Int. Cl.
*H01R 24/50* (2011.01)
*H01R 43/20* (2006.01)

(56) References Cited

U.S. PATENT DOCUMENTS

| | | | | |
|---|---|---|---|---|
| 11,777,219 | B2 * | 10/2023 | Kim | H01Q 9/045<br>343/848 |
| 11,791,542 | B2 * | 10/2023 | Rieder | G01S 13/931<br>343/713 |
| 2015/0118900 | A1 | 4/2015 | Nakamura et al. | |
| 2016/0141759 | A1 * | 5/2016 | Urbasic | H01Q 1/42<br>343/773 |
| 2016/0149306 | A1 * | 5/2016 | Hung | A61B 5/0507<br>600/430 |

* cited by examiner

ELECTRICAL TERMINAL, SYSTEM AND ASSOCIATED METHODS

CROSS REFERENCE TO RELATED APPLICATIONS

This application is a National Stage entry under 35 U.S.C. § 371 of PCT/EP2022/065603, filed on Jun. 8, 2022, and claims priority to EP patent application Ser. No. 21/178,868.2, filed on Jun. 10, 2021, the entire contents of which are incorporated herein by reference.

TECHNICAL FIELD

The present application relates to an electrical terminal to facilitate the feeding of an electrical circuit disposed on a thin support. The present application relates also to a system comprising such electrical terminal.

Background Art

Mobile data traffic is increasing continuously and will boom significantly with 5G, putting mobile network operators under CAPEX pressure. Higher frequency bands for 5G mean more challenges for coverage deployment, especially in dense urban areas where capacity will be needed and strict EMF limitations apply. The deployment of small cells are described as a good solution for capacity improvement which requires to install a large number of antennas in order to stably perform electromagnetic wave transmission and reception.

However, many drawbacks limit the deployment of small cells. First, it is very difficult to find location for new antennas. Second, bringing fiber and electricity outdoor is costly. Finally, urbanistic regulations may limit possibilities for small cells.

On top of that, with the advent of connected and autonomous vehicles, the number of required onboard antennas is ever increasing, and finding suitable locations becomes more and more complicated especially for Wi-Fi, 4G, 5G and DSRC, DTV, FM, . . . .

In a vehicle, antenna are usually placed on a glazing or on the roof inside a shark fin, or a roof module.

To connect to a functional system and to feed an antenna, a terminal is used between the cable and the antenna.

Existing terminals on the market are based on solder techniques to make the connection for the antenna to the terminal. One of the quite common use is the U.FL connector as a terminal. Such terminals are soldered on the antenna to feed it.

Antenna can be disposed on a substrate such as glass or thin support.

However, with low-temperature resistance substrate such as a thin support, the substrate cannot withstand the high-temperature of the soldering.

To avoid this low-temperature resistance of thin support, the terminal can be glued with a conductive glue. This solution however has an issue of mechanical resistance, which can be removed from the support causing disconnections, quality issues, aging problems, . . . .

SUMMARY OF INVENTION

The present invention relates, in a first aspect, to an electrical terminal for electrically connecting a cable to an electrical circuit disposed on a thin support comprising

- a connection part comprising a center-pin (3), and a surrounding metallic ring (4)
- a base part comprising a dielectric substrate (2) having a top surface (2.1) and a bottom surface (2.2), a ring metallic pad (5) electrically connected to the surrounding metallic ring, and a pin metallic pad (6) electrically connected to the center-pin and electrically isolated from the ring metallic pad; the ring metallic pad and the pin metallic pad been disposed on the bottom surface; the connection part been disposed on the top surface of the base part and is extending substantially perpendicular to the top surface.

The present invention relates, in a second aspect, to an system comprising a thin support, an electrical circuit disposed on a thin support, an electrical terminal for electrically connecting a cable to the electrical circuit comprising

- a connection part comprising a center-pin (3), and a surrounding metallic ring (4)
- a base part comprising a dielectric substrate (2) having a top surface (2.1) and a bottom surface (2.2), a ring metallic pad (5) electrically connected to the surrounding metallic ring, and a pin metallic pad (6) electrically connected to the center-pin and electrically isolated from the ring metallic pad; the ring metallic pad and the pin metallic pad been disposed on the bottom surface; the connection part been disposed on the top surface of the base part and is extending substantially perpendicular to the top surface.

The solution as defined in the first aspect and in the second aspect of the present invention is based on that the base part further comprises a ring penetration means (8) designed to penetrate through the thin support.

The solution as defined in the first aspect and in the second aspect of the present invention is also based on that the dielectric substrate and the ring penetration means are not coplanar.

By penetrating through the thin support, the ring penetration means, not coplanar with the dielectric substrate, mechanically maintains the electrical terminal to the thin support while the electrical terminal is electrically connected to the electrical circuit.

The present invention relates, in a third aspect, to a vehicle comprising a system according to the second aspect of the present invention.

The present invention relates, in a fourth aspect, to a method for connecting a cable to electrical circuit for electrically connecting a cable to an electrical circuit disposed on a thin support with an electrical terminal.

The solution as defined in the fourth aspect of the present invention is based on that the method comprises the electrical terminal comprising

- a connection part comprising a center-pin (3), and a surrounding metallic ring (4)
- a base part comprising a dielectric substrate (2) having a top surface (2.1) and a bottom surface (2.2), a ring metallic pad (5) electrically connected to the surrounding metallic ring, and a pin metallic pad (6) electrically connected to the center-pin and electrically isolated from the ring metallic pad; the ring metallic pad and the pin metallic pad been disposed on the bottom surface; the connection part been disposed on the top surface of the base part and is extending substantially perpendicular to the top surface.

The method further comprises the base part further comprises a ring penetration means (8) designed to penetrate through the thin support. The dielectric substrate and the ring penetration means are not coplanar.

The solution as defined in the fourth aspect of the present invention is also based on that the method comprises a step of pressing the electrical terminal to let the ring penetration means penetrates through the thin support over the electrical circuit to electrically connect the center-pin and the surrounding metallic ring to the electrical circuit.

Surprisingly, this solution according to the first, second, third and fourth aspects permits to improve the mechanical resistance while improving the handling reducing quality issues and aging problems thanks to the ring penetration means penetrating through the thin support the electrical terminal.

Thus, the electrical system according to the invention permits to electrically connect a cable to an electrical circuit disposed on a thin support in an easy, fast and durable way.

The present invention increases quality and the durability of an system according to the second aspect.

Furthermore, the electrical terminal helps the contact with the electrical circuit surface and resist to any movement.

Therefore, the present invention solves the need to find new location to place systems while allowing greater handling and quality.

It is noted that the invention relates to all possible combinations of features recited in the claims or in the described embodiments.

The following description relates to vehicle applications but it's understood that the invention may be applicable to others fields like transportation applications, other road users and/or services and buildings applications.

BRIEF DESCRIPTION OF THE DRAWINGS

This and other aspects of the present invention will now be described in more detail, with reference to the appended drawings showing various exemplifying embodiments of the invention which are provided by way of illustration and not of limitation. The drawings are a schematic representation and not true to scale. The drawings do not restrict the invention in any way. More advantages will be explained with examples.

DETAILED DESCRIPTION

Figure 1:
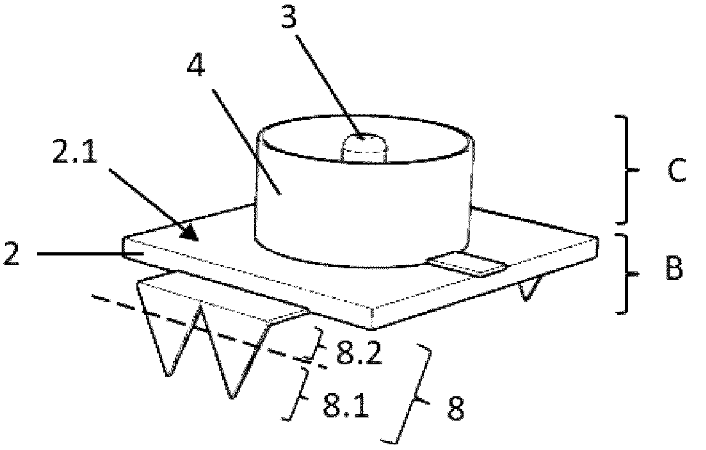
FIG. 1 is a schematic 3D view from the top of an electrical terminal according to the first aspect of the invention.

In this document to a specific embodiment and include various changes, equivalents, and/or replacements of a corresponding embodiment. The same reference numbers are used throughout the drawings to refer to the same or like parts.

As used herein, spatial or directional terms, such as "inner", "outer", "above", "below", "top", "bottom", and the like, relate to the invention as it is shown in the drawing figures. However, it is to be understood that the invention can assume various alternative orientations and, accordingly, such terms are not to be considered as limiting. Further, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims are approximations that can vary depending upon the desired properties sought to be obtained by the present invention. In the following description, unless otherwise specified, expression "substantially" mean to within 10%, preferably to within 5%.

Moreover, all ranges disclosed herein are to be understood to be inclusive of the beginning and ending range values and to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Further, as used herein, the terms "deposited over" or "provided over" mean deposited or provided on but not necessarily in surface contact with. For example, a coating "deposited over" a substrate does not preclude the presence of one or more other coating films of the same or different composition located between the deposited coating and the substrate.

Where the term "comprising" is used in the present description and claims, it does not exclude other elements or steps. Where an indefinite or definite article is used when referring to a singular noun e.g. "a" or "an", "the", this includes a plural of that noun unless something else is specifically stated. In this document, "configured to (or set to)" may be interchangeably used in hardware and software with, for example, "appropriate to", "having a capability to", "changed to", "made to", "capable of", or "designed to" according to a situation. In any situation, an expression "device configured to do" may mean that the device "can do" together with another device or component.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein. When it is described that a constituent element (e.g., a first constituent element) is "(functionally or communicatively) coupled to" or is "connected to" another constituent element (e.g., a second constituent element), it should be understood that the constituent element may be directly connected to the another constituent element or may be connected to the another constituent element through another constituent element (e.g., a third constituent element).

Figure 2:
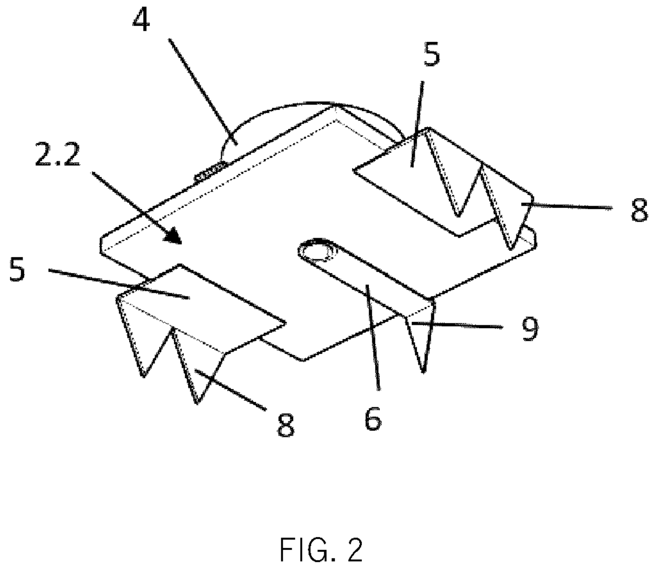
FIG. 2 is a schematic 3D view from the bottom of an electrical terminal according to the first aspect of the invention.

According to a first aspect of the invention, as illustrated in FIGS. 1 and 2, the electrical terminal 1 for electrically connecting a cable to an electrical circuit disposed on a thin support comprises a connection part C and a base part B. The connection part allows to connect a cable to the electrical terminal while the connection with an electrical circuit is provided with some parts of the base part comprising a dielectric substrate 2 having a top surface 2.1 and a bottom surface 2.2.

The term thin support means a support having a thickness equals to or lower than 5 mm, preferably equals to or lower than 3 mm.

The dielectric substrate can be made of any dielectric material able to receive a connection part on it. It is understood that dielectric means that the substrate is non-conductive.

According to the invention, the dielectric substrate can be FR4 (epoxy glass), filled PTFE with glass or ceramics, Bakelite, high-frequency circuit laminates, thermoplastic materials such as PPE, PPO, hydrocarbon-based materials with ceramic fillers, liquid-crystalline-polymer (LCP) materials or polyetheretherketone (PEEK) thermoplastic materials or any other dielectric material suitable to attach on it a connection part to connect a cable while able to be fixed on a thin support.

The connection part comprises a center-pin 3 and a surrounding metallic ring 4.

As illustrated in FIG. 1, the connection part been disposed on the top surface of the base part and is extending substantially perpendicular to the top surface meaning that the center-pin 3 and the surrounding metallic ring 4 extends, substantially normal to the first surface 2.1, from the first surface 2.1 of the base part B in the opposite direction to the second surface 2.2.

The terms center pin and surrounding metallic ring are used for distinguishing between elements of the connection part and not necessarily for describing a specific design or in any other manner. It is understood that the center-pin and the surrounding metallic ring can have any 3D shape in order to connect a connector, configured to be plugged to the connection part, in which a cable is assembled on. In preferred embodiments but not limited to and as illustrated in figures, the center-pin has a 3D shape of a pin and the surrounding metallic ring has a 3D shape of a surrounding ring surrounding the pin.

The base part B further comprises a ring metallic pad 5 electrically connected to the surrounding metallic ring 4, and a pin metallic pad 6 electrically connected to the center-pin 3 and electrically isolated from the ring metallic pad 4.

The ring metallic pad and the pin metallic pad been disposed on the bottom surface. The ring metallic pad 5 and the pin metallic pad 6 extend from the bottom surface 2.2 of the base part 2 to electrically connect to an electrical circuit.

In some embodiments, the base part can comprises two ring metallic pads 5.

To electrically connect a cable to an electrical circuit, it is understood that the center-pin, the surrounding metallic ring, the ring metallic pad and the pin metallic pad comprises at least on their surfaces a conductive material. Preferably, the center-pin, the surrounding metallic ring, the ring metallic pad and the pin metallic pad are made of conductive material such as Aluminum; copper alloys; beryllium copper; Phosphor bronze; brass; gold; nickel and nickel base alloys, silver or nickel plated stainless steel or any conductive material suitable for such application According to the invention, the base part further comprises a ring penetration means 8 designed to penetrate through a thin support. The dielectric substrate and the ring penetration means are not coplanar to permit to maintain the electrical terminal on a thin support.

It is understood that the ring penetration means can also penetrate through an electrical circuit disposed on a thin support and through the thin support.

In some embodiments according to the invention, the ring penetration means is directly fixed to the dielectric substrate. In such embodiments, the ring penetration means is preferably nonconductive. The electrical connection of the electrical circuit is made by physical contact between the electrical circuit and the ring metallic pad and the pin metallic pad.

In some other embodiments according to the invention, the ring penetration means is directly fixed to the ring metallic pad.

As illustrated in FIGS. 1 and 2, the ring penetration means 8 can be directly fixed to the ring metallic pad 5. The ring penetration means can be an elongated part of the ring metallic pad.

Preferably, in such embodiments, the ring penetration means can be electrically connected to the ring metallic pad the ring penetration means 8 is conductive. An electrical circuit can be connected to the surrounding metallic ring 4 via at the same time the ring penetration means 8 and the ring metallic pad 5.

The ring penetration means can be made of a conductor plated or not plastic-based material or can be made of a conductive based material such as Aluminum; copper alloys; beryllium copper; Phosphor bronze; brass; gold; nickel and nickel base alloys, silver or nickel plated stainless steel or any conductive material suitable to act as a conductor while able to penetrate a thin support. The ring penetration means can also be coated or surface-treated to improve the conductivity and/or the mechanical resistance. Preferably, in some embodiments, the ring penetration means has the same composition than the ring metallic pad.

In some embodiments, each of ring metallic pads has a ring penetration means.

In some embodiments, the ring penetration means comprises a tine to penetrate through at least the a thin support. More preferably, the ring penetration means comprises a plurality of tines to facilitate to penetration through at least the a thin support.

The ring penetration means can also as a generic triangle shape, a hook-like shape, teeth-like shape or any shape that can penetrate through at least a thin support and more preferably trough a thin support and an electrical circuit disposed on the thin support. At least a part of the sides of the ring penetration means can be sharpen to facilitate the penetration.

According to the invention, the ring penetration means can have dimension ranging from submillimeter, substantially 0.1 mm to 10 cm in width, and height ranging from 0.1 mm to 10 cm. The dimension can be also adapted for the required working frequencies of the electrical circuit as well as the size of the electrical connection points to the electrical circuit.

In some embodiments according to the invention, the base part can further comprise a pin penetration means 9 designed to penetrate through a thin support. The dielectric substrate 2 and the pin penetration means 9 are not coplanar to permit to maintain the electrical terminal on a thin support.

Coplanar means that the ring penetration means and the base are not in the same plan even if ring penetration means are at least partially folded on the bottom surface and means that the pin penetration means and the base are not in the same plan even if pin penetration means are at least partially folded on the bottom surface.

It is understood that the pin penetration means can also penetrate through an electrical circuit disposed on a thin support and through the thin support.

In some embodiments according to the invention, the pin penetration means is directly fixed to the dielectric substrate. In such embodiments, the pin penetration means is preferably nonconductive. The electrical connection of the electrical circuit is made by physical contact between the electrical circuit and the pin metallic pad and the pin penetration means.

In some other embodiments according to the invention, the pin penetration means is directly fixed to the pin metallic pad.

As illustrated in FIGS. 1 and 2, the pin penetration means 9 can be directly fixed to the pin metallic pad 6. The pin penetration means can be an elongated part of the pin metallic pad.

Preferably, in such embodiments, the pin penetration means can be electrically connected to the ring metallic pad the ring penetration means 8 is conductive. An electrical circuit can be connected to the surrounding metallic ring 4 via at the same time the ring penetration means 8 and the ring metallic pad 5.

The pin penetration can be made of a conductor plated or not plastic-based material or can be made of a conductive based material such as Aluminum; copper alloys; beryllium copper; Phosphor bronze; brass; gold; nickel and nickel base alloys, silver or nickel plated stainless steel or any conductive material suitable to act as a conductor while able to penetrate a thin support. The pin penetration means can also be coated or surface-treated to improve the conductivity and/or the mechanical resistance. Preferably, in some embodiments, the pin penetration means has the same composition than the pin metallic pad.

In some embodiments, the pin penetration means comprises a tine to penetrate through at least the a thin support. More preferably, the pin penetration means comprises a plurality of tines to facilitate to penetration through at least the a thin support.

The pin penetration means can also as a generic triangle, with or without cutted corner, shape with or without notches, a hook-like shape, a teeth-like shape or any shape that can penetrate through at least a thin support and more preferably trough a thin support and an electrical circuit disposed on the thin support. At least a part of the sides of the ring penetration means can be sharpen to facilitate the penetration.

According to the invention, the pin penetration means can have dimension ranging from submillimeter, substantially 0.1 mm to 10 cm in width, and height ranging from 0.1 mm to 10 cm. The dimension can be also adapted for the required working frequencies of the electrical circuit as well as the size of the electrical connection points to the electrical circuit.

Figure 3:
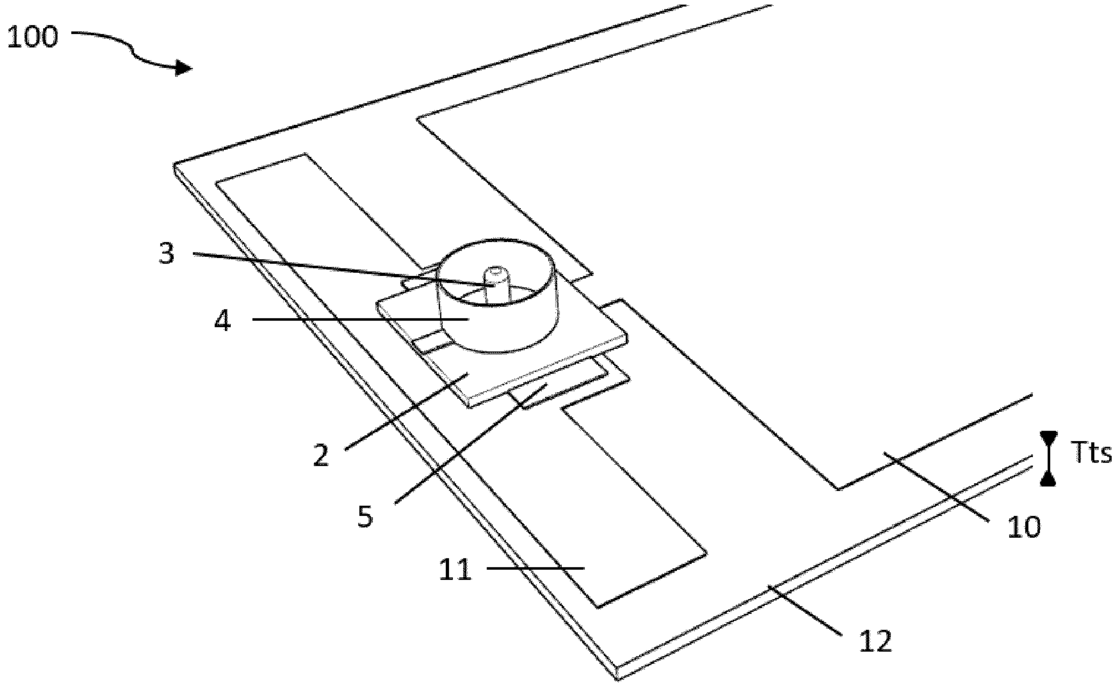
FIG. 3 is a schematic 3D view from the top of a system according to the second aspect of the invention.

As illustrated in FIG. 3, the invention relates to an system 100 comprising a thin support 12, an electrical circuit 10, 11 disposed on the thin support.

The thin support can take different forms and shapes, where its dimension (length and/or width) is varied, which can be between a millimeter to few meters.

Depending on the application, the thin support has a thickness, Tts, is comprised between 10 μm and 3 mm (0.01 mm≤ Tts≤3 mm). Depending on the application, the thickness can be 20 μm, 50 μm, 75 μm, 75 μm, 100 μm 125 μm, 150 μm or any specific value.

In some preferred embodiments, the thickness of the thin support is comprised between 20 μm and 250 μm (0.02 mm≤ Tts≤0.25 mm).

According to the invention, the thin support can be a mono-layer or a multilayers structure of the same or of different materials, where the electrical circuit can be deposited on. In is understood that the thin support functions as a dielectric substrate for the electrical circuit.

The thin support is preferably a thin plastic support. The thin support can be any dielectric material used in printed circuit or a more flexible material used as flexible substrate, such as a polymer, a plastic, a laminated materials or any other suitable material such as Polyethylene—PE, Polyethylene terephthalate—PET, polystyrene—PS, polyamide—PA, polyvinyl chloride—PVC, polycarbonate—PC, Polypropylene—PP, polyethylene furanoate—PEF. Preferably, the thin support comprises PET, but can be any other plastic materials depending on the application and the way to fix the thin support on an object, the needed durability due to external exposition such as sun, temperature, . . . .

According the invention, the thin support and the electrical circuit can be produced using standard PCB technologies, screen-printing the metallization on the thin film, inkjet printing the metallization on the thin film or any other known technology to metalize a thin support meaning to place the electrical circuit on a thin support.

The electrical circuit can comprises two parts 10, 11. These two parts are electrically isolated. The center-pin is connected to one of the two parts and the surrounding metallic ring is connected to the other part of the two parts.

The electrical circuit is disposed on the thin support. The term "disposed on" means that the electrical circuit can be a conductive layer printed, screen printed, inkjet printed, deposited or other similar methods suitable to disposed an electrical circuit on a thin support. The electrical circuit can also be realized using etching or laser decoating technologies to design the electrical circuit by creating nonconductive areas. The electrical circuit can also be made of metal mesh film, consisting of several thin connected wires forming the electrical circuit shape or a printed circuit.

According to the invention, the electrical circuit is made of conductive material. The materials for making electrical circuit can be of any high-conductivity material such as but not limited to copper, silver, copper ink.

In some preferred embodiments, the electrical circuit can be an antenna. The antenna is preferably multiple-bands antenna used for communication such as Wi-Fi, FM, AM, TV, remote key entry (RKE), telematics/cellular electrical circuits such as 2G, 3G, 4G, 5G, satellite, GPS navigation, V2X, DSRC, or any other radio broadcast applications. In multiple bands antenna embodiments, the antenna can comprises two parts 10, 11, a radiation part 10 designed to act as a radiating element and a ground part 11 designed to act as a ground plate. It is understood that the working frequency range of the antenna depends on the design of the antenna.

According to an embodiment, the thin support is a PEN film with a thickness of 50 μm and the electrical circuit is a copper layer with a thickness between 10 μm and 50 μm disposed on the surface of the thin support forming a multiband antenna especially a 4G and/or 5G antenna.

According to an embodiment, the thin support is a PET film with a thickness of about 50 μm and the electrical circuit is a copper layer with a thickness between 10 μm and 50 μm disposed on the surface of the thin support forming a multiband antenna especially a 4G and/or 5G antenna.

According to an embodiment, the thin support is a PI film with a thickness of about 50 μm and the electrical circuit is a copper layer with a thickness between 10 μm and 50 μm disposed on the surface of the thin support forming a multiband antenna especially a 4G and/or 5G antenna.

According to some embodiments, the electrical circuit is a copper layer of about 18 μm or about 35 μm.

In such embodiments, a cable (not shown) is electrically connected to the connection part C. The center-pin 3 is then electrically connected to the radiation part 10 and the surrounding metallic ring 4 is electrically connected to the ground plate 11.

Figure 4:
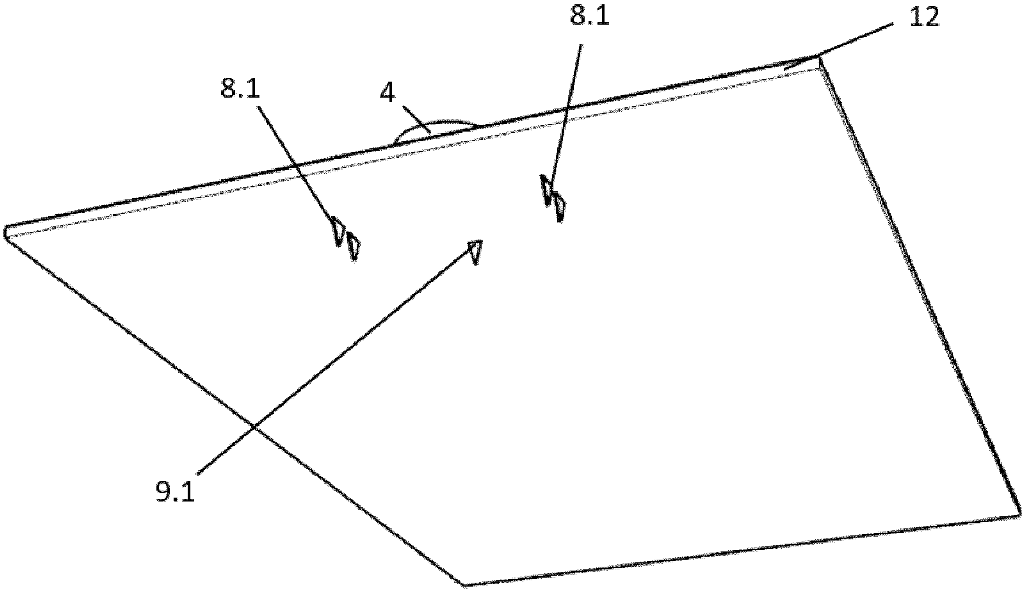
FIG. 4 is a schematic 3D view from the bottom of a system according to the second aspect of the invention.
Figure 5:
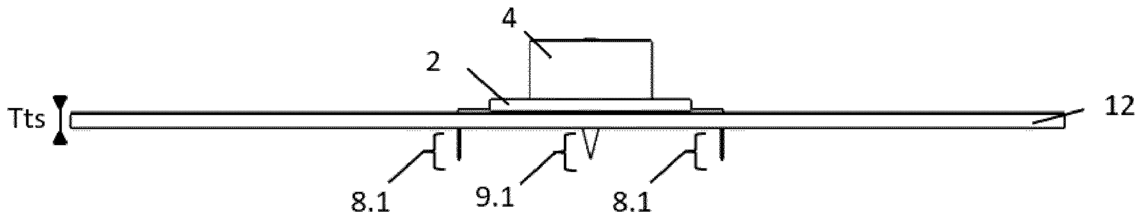
FIG. 5 is a schematic view from a side of a system according to the second aspect of the invention.

As illustrated in FIGS. 4 and 5, the system can comprise two ring penetration means and a pin penetration means penetrated through the electrical circuit and the thin support. These two ring penetration means can be each connected to a different ring metallic pad.

A part 8.1 of the two ring penetration means and a part 9.1 of a pin penetration means having passed through the support comes out of the opposite face from the penetration. Such parts can own notches or hook-like shape to prevent the electrical terminal from being withdrawn.

In some embodiments, parts 8.1, 9.1 having passed through the support can be bent over the opposite surface to the penetration of the thin support to ensure the mechanical strength of the system. Even if some parts are bent, the ring penetration means and the pin penetration means are not coplanar with the dielectric substrate.

The at least one ring penetration means and the pin penetration means, if exists, permits to clamp the electrical circuit between the electrical terminal and the thin support to ensure electrical connection between the ring metallic pad and the ground part and to ensure electrical connection between the pin metallic pad and the radiating part.

The invention also relates to a vehicle comprising a least one system, especially a multiple-bands antenna, according to the third aspect of the invention to install electrical circuit on location where it was difficult to install electrical circuit.

The system can be install on any other location where people needs to install electrical circuit, especially antennas, disposed on a thin support. system can be placed on a surface of a glazing panel, such as a windshield, a sidelite, a roof, a backlite on a plastic part of a vehicle such as a spoiler, a B-pillar, a bumper, . . . The system can also be placed in front of such element to avoid to fix the system directly on the surface of it.

An embodiment provides a method for connecting a cable (not shown) to electrical circuit 10, 11 for electrically connecting a cable to an electrical circuit disposed on a thin support 12 with an electrical terminal 1 according to the first aspect of the invention to create an system 100 according to the second aspect of the present invention.

Figure 6:
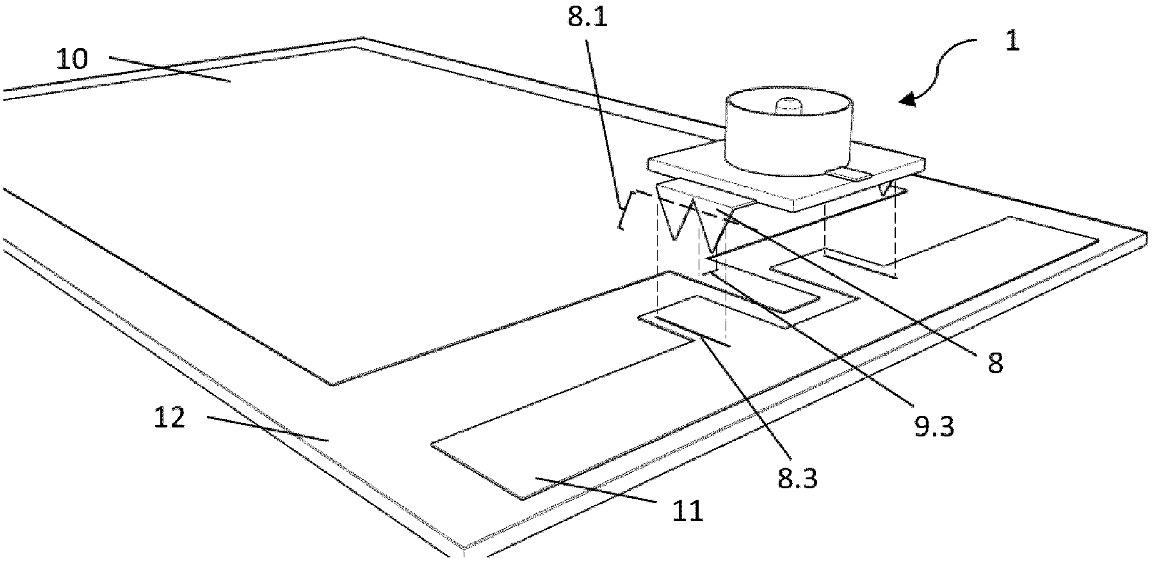
FIG. 6 is a schematic 3D view from the top of an electrical terminal according to the first aspect of the present invention penetrating trough an electrical circuit disposed on a thin support according to the invention.

As illustrated in FIG. 6, the method comprises a pressing step of pressing the electrical terminal to let the at least one ring penetration means penetrates through the thin support over the electrical circuit to electrically connect the center-pin and the surrounding metallic ring to the electrical circuit.

This pressing step allows the at least one ring penetration means and the pin penetrating means, if exists, to perforate 8.3, 9.3 the thin support and eventually the electrical circuit to create electrical connection between the electrical circuit and the connection part of the electrical terminal.

It is understood that if a pin penetration means exists, this pressing step also let the pin penetration means penetrates through the thin support.

The method can comprises a bending step to bend parts 8.1, 9.1 having passed through the support comes out of the opposite face from the penetration. This step can be made during or after the pressing step.

The bending step allows to avoid using a specific strain relief and allows to maintain the electrical terminal electrically connected to electrical circuit and attached to the thin support.

The method can comprises an overmolding step after the pressing step. This step comprises a sub-step of placing the system into a mold having a two molding parts, a sub-step of closing these two molding parts to form a closed space around the system and a sub-step of injecting a plastic-based material into the closed space to form a overmolded element over at least a part of the system, preferably over at least the part.

The overmolding part allows to reduce the aging issues, increase the tightness of the system while reducing pulling out issues.

The plastic-based material can be made of a thermoplastic material, polyurethane (PU), polyamide, acrylic, polycarbonate, polyoxymethylene (POM), Polystyrene (PS), Acrylonitrile butadiene styrene (ABS), Polypropylene (PP), Polyethylene (PE), thermoplastic polyurethane (TPU), thermoplastic rubber (TPR), an epoxy, an acrylic resin or any suitable material to be injected into a mold. The temperature, the pressure can be adapted to be adapted to a specific embodiment.

The method can comprises a connecting step of connecting a cable to the electrical terminal. This step can be made before or over the overmolding step, if exists, depending on the parts of the system to be overmolded.

An embodiment provides a use of an system according to the second aspect to let a user or a vehicle to communicate with his environment.

The invention claimed is:

1. An electrical terminal for electrically connecting a cable to an electrical circuit disposed on a thin support comprising:

a connection part comprising a center-pin, and a surrounding metallic ring; and a base part comprising a dielectric substrate having a top surface and a bottom surface, a ring metallic pad electrically connected to the surrounding metallic ring, and a pin metallic pad electrically connected to the center-pin and electrically isolated from the ring metallic pad; the ring metallic pad and the pin metallic pad disposed on the bottom surface; the connection part disposed on the top surface of the base part and extending substantially perpendicular to the top surface, wherein the base part further comprises a ring penetration means designed to penetrate through the thin support, and wherein the dielectric substrate and the ring penetration means are not coplanar.

2. The electrical terminal according to claim 1, wherein the ring penetration means is electrically connected to the ring metallic pad.

3. The electrical terminal according to claim 1, wherein the base part further comprises a pin penetration means designed to penetrate through the thin support and wherein the dielectric substrate and the pin penetration means are not coplanar.

4. The electrical terminal according to claim 3, wherein the pin penetration means is electrically connected to the pin metallic pad.

5. The electrical terminal according to claim 3, wherein the pin penetration means comprises at least a tine.

6. The electrical terminal according to claim 1, wherein the ring penetration means comprises at least a tine.

7. The electrical terminal according to claim 1, wherein the ring penetration means comprises a part to be bent.

8. A system comprising a thin support, an electrical circuit disposed on the thin support, an electrical terminal for electrically connecting a cable to the electrical circuit, the electrical terminal comprising:

a connection part comprising a center-pin, and a surrounding metallic ring; and a base part comprising a dielectric substrate having a top surface and a bottom surface, a ring metallic pad electrically connected to the surrounding metallic ring, and a pin metallic pad electrically connected to the center-pin and electrically isolated from the ring metallic pad; the ring metallic pad and the pin metallic pad been disposed on the bottom surface; the connection part disposed on the top surface of the base part and extending substantially perpendicular to the top surface, wherein the base part further comprises a ring penetration means penetrating through the thin support, and wherein the dielectric substrate and the ring penetration means are not coplanar.

9. The system according to claim 8, wherein the ring penetration means is electrically connected to the ring metallic pad.

10. The system according to claim 8, wherein the electrical circuit is an antenna.

11. A vehicle comprising a least one system according to claim 8.

12. A method for connecting a cable to an electrical circuit for electrically connecting a cable to an electrical circuit disposed on a thin support with an electrical terminal, wherein the electrical terminal comprises:

a connection part comprising a center-pin, and a surrounding metallic ring, and a base part comprising a dielectric substrate having a top surface and a bottom surface, a ring metallic pad electrically connected to the surrounding metallic ring, and a pin metallic pad electrically connected to the center-pin and electrically isolated from the ring metallic pad; the ring metallic pad and the pin metallic pad disposed on the bottom surface; and the connection part been disposed on the top surface of the base part and is extending substantially perpendicular to the top surface, wherein the base part further comprises a ring penetration means designed to penetrate through the thin support, wherein the dielectric substrate and the ring penetration means are not coplanar, the method comprising pressing the electrical terminal to let the ring penetration means penetrate through the thin support over the electrical circuit to electrically connect the center-pin and the surrounding metallic ring to the electrical circuit.

13. The system according to claim 8, wherein the electrical circuit is a multi-bands antenna.

* * * * *